INVENTOR
Byron V. McBride.

United States Patent Office 2,763,568
Patented Sept. 18, 1956

2,763,568

METHOD OF PROVIDING A BASE WITH A WRINKLED COATING, WRINKLING COMPOSITION, AND COATED BASE

Byron V. McBride, Irwin, Pa., assignor to Westinghouse Electric Corporation, East Pittsburgh, Pa., a corporation of Pennsylvania Application April 21, 1952, Serial No. 283,317

5 Claims. (Cl. 117—41)

This invention relates to a novel resinous coating composition which upon curing will produce a novel decorative rugose surface finish and a method for controlling the configuration of the same.

Conventional wrinkle finishes heretofore have been prepared by applying films of wrinkle-forming resinous compositions on surfaces and then developing a wrinkle pattern by subsequent baking. The wrinkles so formed have a generally fine texture, the maximum height of the wrinkle ridges usually being in the order of 1/32 inch. Limited control of the textural pattern of the conventional wrinkle finish is obtained by varying the formulation, viscosity and film thickness of the wrinkle-forming composition. The coarsest pattern that can be formed in this manner has very small configurations as compared with the patterns that may be formed with my invention.

In order to better describe my invention, the term rugose will hereinafter be used to describe a heavy coarse wrinkle having folds, loops, corrugations, webbed formations and raised ridges up to 1/4 inch height which are in contrast with the conventional fine textured wrinkle described above.

An object of this invention is to provide on members a rugose resinous surface coating having a finished pattern of predetermined configuration.

Another object of this invention is to provide a composition comprising a mixture of tung-oil, a bentonite-amine reaction product, and metal drier which when applied to a member and then cured in a particular manner will produce a novel decorative rugose surface coating.

Another object of this invention is to provide a method for producing a decorative rugose surface finish of a predetermined pattern by applying to a member a coating composition which upon air drying will progressively wrinkle to heavy rugae, the development of the rugae being terminated at the desired configuration pattern by heat treating the applied coating.

Other objects of the invention will, in part, be obvious and will, in part, appear hereinatfer.

Figure 6:
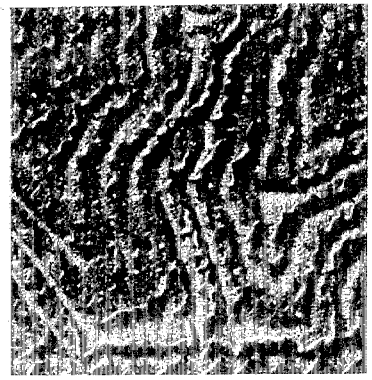
Figure 7:
Figure 8:
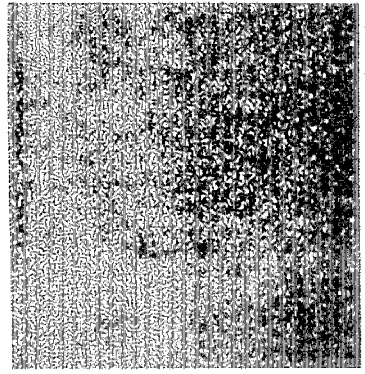

For a fuller understanding of the nature and objects of the invention, reference should be had to the following detailed description and drawing, in which:

Figs. 1 to 7 are full-size photographs illustrative of the rugose patterns formed from selected formulations, and Fig. 8 is a full-size photographic illustration of a conventional wrinkle finish.

I have discovered that upon exposure to air of a coating of a composition which is formulated by admixing predetermined quantities of (1) selected drying oils, (2) metal drier and (3) a bentonite-amine reaction product, a novel decorative rugose surface pattern is formed.

The drying oils utilized in the coating composition formulation comprise a mixture of which at least 30% by weight is tung oil or oiticia oil or mixtures of both. The tung or oiticia oils or mixtures thereof may comprise raw oil or bodied oil. Examples of suitable bodied oils are from medium thick to extra thick, having a viscosity of from 50 poises to 600 poises, respectively, at 25° C. The balance making up the weight of the drying oils may be any other drying oil, such for example as linseed oil, dehydrated castor oil, soya oil, or mixtures of any two or more thereof. Rosin may be employed to replace a part or all of the drying oil other than the tung oil and oiticia oil. The total quantity of drying oil used should be from 40 to 90 parts by weight per 100 parts of the combined drying oils and bentonite-amine reaction product in the coating composition formulation.

The metal driers used may be any one of the heavy metal soaps, such, for instance, as the abietates, laurates, or naphthenates of the metals manganese, cobalt, zinc, and lead. Typical commercial driers that were used had the following percentage by weight of metal:

|           | Percent |
|-----------|---------|
| Manganese | 4       |
| Cobalt    | 6       |
| Zinc      | 6       |
| Lead      | 24      |

However, the proportion of metal in the drier may vary from these values. The amount of metal drier used in the composition formulation should be sufficient to provide from 1/4% to 5% by weight of metal based on the weight of the drying oil. The metal drier is usually added to the composition in solution form.

From 10 to 60 parts by weight of a bentonite-amine reaction product is admixed with the drying oil to provide a total of 100 parts by weight and then the metal drier is added in a sufficient amount to make up the composition formulation. The bentonite-organic base reaction products employed in this invention are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, and tertiary amines and polyamines; also quaternary ammonium compounds, as well as other monovalent or polyvalent onium compounds.

In preparing the bentonite-amine reaction product for my invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desired to react the amine salt with the bentonite in the approximate ratio of 100 milliequivalents of amine salt to 100 grams of bentonite. Reaction products produced within this ratio give the maximum swelling as tested in nitrobenzene.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

An example of the preparation of a suitable bentonite-amine reaction product is as follows:

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in the patent to Jordan 2,531,440, issued November 28, 1950, and the patent to Hauser 2,531,427, issued November 28, 1950. One or more of the bentonite-amine reaction products may be applied to the drying oil.

In practicing my invention, a smooth layer, film or coating of the prepared composition formulation is applied to a member by either a brush, trowel, spray gun, doctor blade, or other suitable means. The applied composition is cured by air drying for a period of time of up to four days, the time depending upon the particular formulation of the composition and the rugose pattern desired. During the curing, fine textured wrinkling initially forms and the wrinkles progressively develop into a rugose surface. The development of the rugae may be terminated at any desired point by heat treating the surface composition at a temperature of at least 60° C. for a period of several minutes, usually not more than 10 minutes being required. However, baking the composition to a fully cured state is ordinarily practiced.

Following are typical examples of the invention, all parts being by weight:

*Example I*

Figure 1:
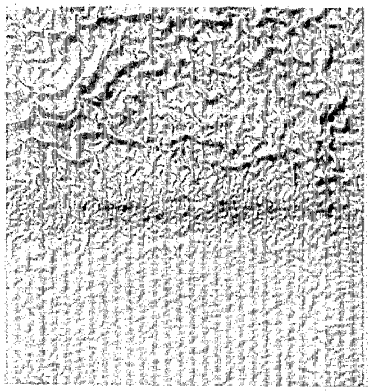

Illustrated in Fig. 1 of the drawing is a pattern formed by applying to a panel a 15 to 20 mil thick coating of a composition having the following formulation:

| | Parts |
|---|---|
| Extra thick tung oil (about 600 poises at 25° C.) | 7 |
| Bentonite-amine reaction product | 7 |
| Cobalt naphthenate | 1 |

The lower half of the drawing illustrates the effect produced after the composition was air dried for 24 hours and then terminating the further formation of rugae by heat treating at 60° C. for a period of several minutes. The top half of the figure illustrates the pattern formed by air drying to a substantially complete cure for 96 hours.

*Example II*

Figure 2:
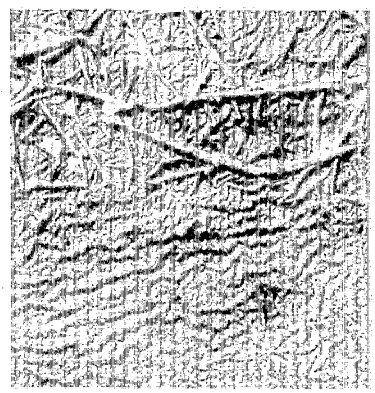

Illustrated in Fig. 2 of the drawing is a pattern formed by applying to a panel a 15 to 20 mil thick coating of composition having the following formulation:

| | Parts |
|---|---|
| Extra thick tung oil (about 600 poises at 25° C.) | 7 |
| Bentonite-amine reaction product | 4 |
| Cobalt naphthenate | 1 |

The lower half of the drawing illustrates the effect produced after the composition was air dried for 24 hours and then terminating the formation of rugae by heat treating at 60° C. for a period of several minutes. The top half of the figure illustrates the pattern formed by air drying to substantially complete curing for 96 hours.

*Example III*

Figure 3:
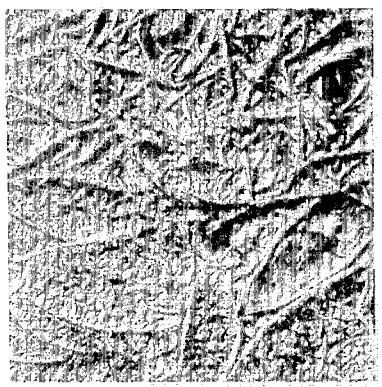

Illustrated in Fig. 3 of the drawing is a pattern formed by applying to a panel a 15 to 20 mil thick coating of composition having the following formulation:

| | Parts |
|---|---|
| Medium thick tung oil (about 50 poises at 25° C.) | 7 |
| Bentonite-amine reaction product | 4 |
| Cobalt naphthenate | 1 |

The lower half of the drawing illustrates the effect produced after the composition was air dried for 24 hours and then terminating the formation of rugae by heat treating at 60° C. for a period of several minutes. The top half of the figure illustrates the pattern formed by air drying to substantially complete curing for 96 hours.

*Example IV*

Figure 4:
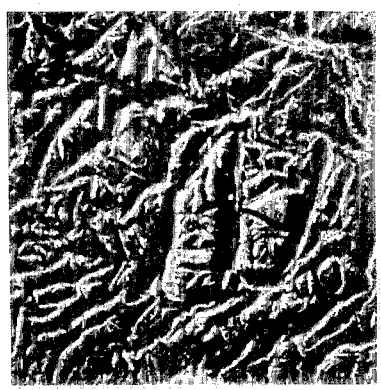

Illustrated in Fig. 4 of the drawing is a pattern from an applied rugose surface forming composition having the following formulation:

| | Parts |
|---|---|
| Medium thick tung oil (about 50 poises at 25° C.) | 10 |
| Bentonite-amine reaction product | 5 |
| Naphthenate drier having metal content of (a) 2 parts cobalt, (b) 1 part lead, (c) 1 part zinc | 1 |

The sample was air dried for 96 hours to substantially complete curing.

*Example V*

Figure 5:
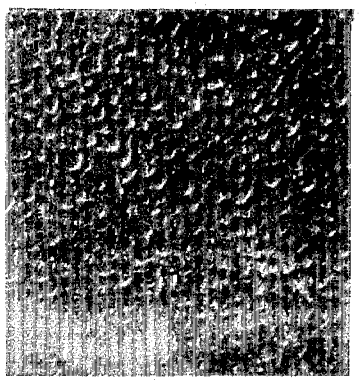

Illustrated in Figs. 5, 6, and 7 of the drawing are patterns formed by applying to panels a 15 to 20 mil thick coating of a composition having the following formulation:

| | Parts |
|---|---|
| Medium thick tung oil (about 50 poises at 25° C.) | 10 |
| Bentonite-amine reaction product | 5 |
| Manganese laurate | 1 |

Figs. 5, 6, and 7 illustrate the progressive development of the rugae after air drying for periods of 24 hours, 48 hours, and 96 hours, respectively. The development of the rugae illustrated in each figure was terminated at the state illustrated by heat treating the surface composition at a temperature of 60° C. for a period of one hour.

Illustrated in Fig. 8 of the drawing is a well-known conventional wrinkle finish such as taught by the patent to Root, No. 1,864,763, issued June 28, 1932.

The following are further examples of formulations of rugose surface forming compositions that have been prepared. The patterns formed thereby (not illustrated) varied from a texture slightly heavier than the conventional finish shown in Fig. 8 to heavy loops and folds up to ¼ inch in height as visible in Fig. 7 in particular. In each example, the composition was air dried to substantially complete curing, usually for a period of 96 hours.

*Example VI*

| | Parts |
|---|---|
| Medium thick tung oil | 10 |
| Bentonite-amine reaction product | 5 |
| Cobalt naphthenate drier | 1 |

*Example VII*

| | Parts |
|---|---|
| Medium thick tung oil | 10 |
| Bentonite-amine reaction product | 5 |
| Naphthenate drier having metal content of (a) 3 parts cobalt, (b) 1 part lead | 1 |

*Example VIII*

| | Parts |
|---|---|
| Medium thick tung oil | 10 |
| Bentonite-amine reaction product | 5 |
| Naphthenate drier having metal content of (a) 3 parts cobalt, (b) 1 part zinc | 1 |

*Example IX*

| | Parts |
|---|---|
| Medium thick tung oil | 10 |
| Bentonite-amine reaction product | 5 |
| Naphthenate drier having metal content of (a) 1 part cobalt, (b) 1 part lead | 1 |

*Example X*

| | Parts |
|---|---|
| Medium thick tung oil | 10 |
| Bentonite-amine reaction product | 5 |
| Naphthenate drier having metal content of (a) 1 part cobalt, (b) 1 part zinc | 1 |

Example XI

| | Parts |
|---|---|
| Medium thick tung oil | 10 |
| Bentonite-amine reaction product | 5 |
| Naphthenate drier having metal content of (a) 1 part cobalt, (b) 3 parts lead | 1 |

Example XII

| | Parts |
|---|---|
| Medium thick tung oil | 10 |
| Bentonite-amine reaction product | 5 |
| Naphthenate drier having metal content of (a) 1 part cobalt, (b) 2 parts lead, (c) 1 part zinc | 1 |

Example XIII

| | Parts |
|---|---|
| Medium thick tung oil | 10 |
| Bentonite-amine reaction product | 5 |
| Naphthenate drier having metal content of (a) 1 part cobalt, (b) 1 part lead, (c) 2 parts zinc | 1 |

Example XIV

| | Parts |
|---|---|
| Medium thick tung oil | 10 |
| Bentonite-amine reaction product | 5 |
| Naphthenate drier having metal content of (a) 1 part cobalt, (b) 3 parts zinc | 1 |

Example XV

| | Parts |
|---|---|
| Medium thick tung oil | 10 |
| Bentonite-amine reaction product | 5 |
| Lead naphthenate drier | 1 |

Example XVI

| | Parts |
|---|---|
| Medium thick tung oil | 10 |
| Bentonite-amine reaction product | 5 |
| Naphthenate drier having metal content of (a) 3 parts lead, (b) 1 part zinc | 1 |

Example XVII

| | Parts |
|---|---|
| Medium thick tung oil | 10 |
| Bentonite-amine reaction product | 5 |
| Naphthenate drier having metal content of (a) 1 part lead, (b) 1 part zinc | 1 |

Example XVIII

| | Parts |
|---|---|
| Medium thick tung oil | 10 |
| Bentonite-amine reaction product | 5 |
| Naphthenate drier having metal content of (a) 1 part lead, (b) 3 parts zinc | 1 |

Example XIX

| | Parts |
|---|---|
| Medium thick tung oil | 10 |
| Bentonite-amine reaction product | 5 |
| Zinc naphthenate drier | 1 |

Example XX

| | Parts |
|---|---|
| Extra thick tung oil | 10 |
| Bentonite-amine reaction product | 2½ |
| Naphthenate drier having metal content of (a) 10 parts lead, (b) 1 part cobalt | 1 |

Example XXI

| | Parts |
|---|---|
| Extra thick tung oil, 1 part; linseed oil, 1 part | 10 |
| Bentonite-amine reaction product | 5 |
| Naphthenate drier having metal content of (a) 10 parts lead, (b) 1 part cobalt | 1 |

Example XXII

| | Parts |
|---|---|
| Extra thick tung oil | 10 |
| Bentonite-amine reaction product | 5 |
| Naphthenate drier having metal content of (a) 10 parts lead, (b) 1 part cobalt | 1 |

Example XXIII

| | Parts |
|---|---|
| Raw tung oil, 1 part; linseed oil, 1 part | 10 |
| Bentonite-amine reaction product | 5 |
| Naphthenate drier having metal content of (a) 10 parts lead, (b) 1 part cobalt | 1 |

Example XXIV

| | Parts |
|---|---|
| Medium thick tung oil, 1 part; raw tung oil, one part | 10 |
| Bentonite-amine reaction product | 5 |
| Naphthenate drier having metal content of (a) 12 parts lead, (b) 1 part cobalt | 1 |

Example XXV

| | Parts |
|---|---|
| Medium thick tung oil | 10 |
| Bentonite-amine reaction product | 5 |
| Cobalt naphthenate drier | 1 |

Example XXVI

| | Parts |
|---|---|
| Raw tung oil | 10 |
| Bentonite-amine reaction product | 5 |
| Naphthenate drier having metal content of (a) 10 parts lead, (b) 1 part cobalt | 1 |

Example XXVII

| | Parts |
|---|---|
| Extra thick tung oil, 1 part; rosin, 1 part | 10 |
| Bentonite-amine reaction product | 5 |
| Naphthenate drier having metal content of (a) 12 parts lead, (b) 1 part cobalt | 1 |

Example XXVIII

| | Parts |
|---|---|
| Medium thick tung oil | 10 |
| Bentonite-amine reaction product | 5 |
| Cobalt naphthenate drier | 2 |

Example XXIX

| | Parts |
|---|---|
| Raw tung oil | 10 |
| Bentonite-amine reaction product | 10 |
| Naphthenate drier having metal content of (a) 10 parts lead, (b) 1 part cobalt | 1 |

Example XXX

| | Parts |
|---|---|
| Medium thick tung oil | 10 |
| Bentonite-amine reaction product | 7½ |
| Naphthenate drier having metal content of (a) 10 parts lead, (b) 1 part cobalt | 2 |

The above examples are a few of the many combinations of formulations that may be prepared. By varying the ratios of metals with mixtures of two or more in the metal drier, different patterns and configurations are obtained. As may be seen in Figs. 1 to 7, the rugae formed by the composition of my invention are of a much heavier pattern and texture as compared to a conventional wrinkle finish illustrated in Fig. 8.

Since certain changes may be made in the above process and different embodiments of the invention can be made without departing from the scope thereof, it is intended that all matter contained in the above description or shown in the accompanying drawing shall be interpreted as illustrative and not in a limiting sense.

I claim as my invention:

1. In the method of providing on a member a decorative rugose resinous surface coating, the steps comprising applying to a surface of the member a composition comprising as its essential ingredients from 40 to 90 parts by weight of a drying oil of which at least 30% by weight is at least one oil selected from the group consisting of tung oil and oiticia oil, from 60 to 10 parts by weight of a bentonite-amine reaction product, and a metal drier in an amount sufficient to provide at least ¼% to 5% by weight of metal based on the weight of the drying oil, air drying at room temperature the coating composition until a rugose surface of desired configuration is reached, and heat treating the applied coating composition to a temperature of at least 60° C. for a period of time of at least several minutes to set the coating composition at the desired configuration.

2. An article of manufacture having a rugose surface coating obtained in accordance with the method described in claim 1.

3. A composition of matter suitable for producing heavy wrinkles and a rugose surface comprising as its essential ingredients from 40 to 90 parts by weight of a drying oil of which at least 30% by weight is at least one oil selected from the group consisting of tung oil and oiticia oil, from 60 to 10 parts by weight of a bentonite-amine reaction product, and a metal drier in an amount sufficient to provide at least ¼% to 5% by weight of metal based on the weight of the drying oil.

4. The composition of matter of claim 3 in which the metal drier comprises a compound of a metal selected from at least one of the group consisting of cobalt, lead, zinc and manganese.

5. The composition of matter of claim 3 in which the balance making up the weight of the drying oil is selected from the group consisting of linseed oil, dehydrated castor oil, and soya oil.

References Cited in the file of this patent

UNITED STATES PATENTS

| | | |
|---|---|---|
| Re. 23,212 | Benyon | Mar. 28, 1950 |
| 1,991,527 | Toll | Feb. 19, 1935 |
| 2,441,105 | Socolofsky | May 4, 1948 |
| 2,531,427 | Hauser | Nov. 28, 1950 |
| 2,559,398 | Capell | July 3, 1951 |
| 2,622,987 | Radcliffe | Dec. 23, 1952 |